Aug. 9, 1960
N. E. NELSON
2,948,111
MEANS TO INCREASE STATIC PRESSURE AND
ENHANCE FORWARD THRUST OF
AIRCRAFT COMPONENTS
Filed May 2, 1955
2 Sheets-Sheet 1
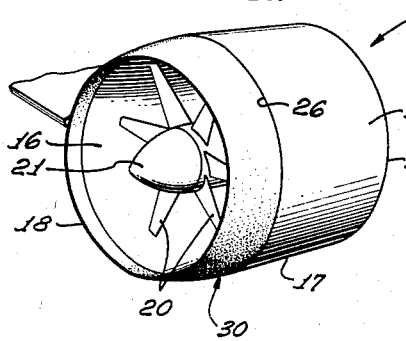
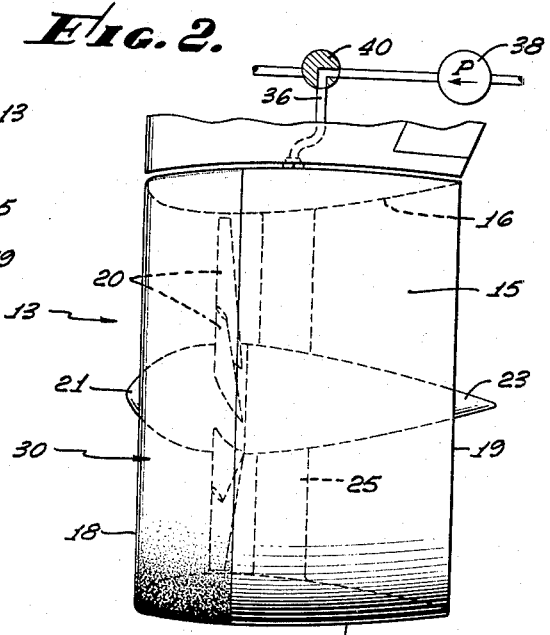
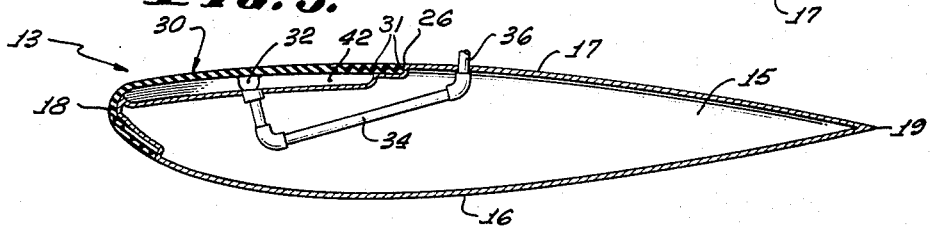
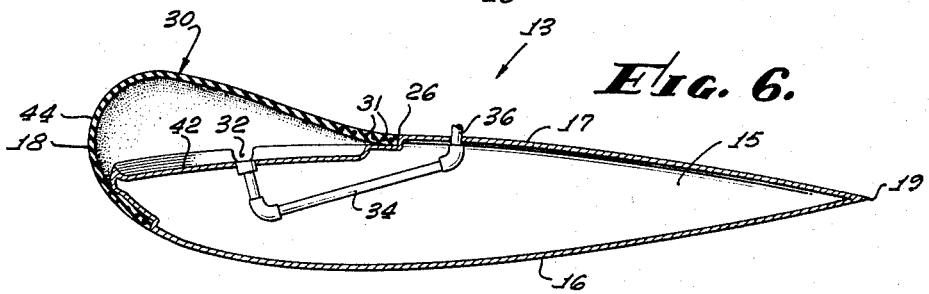
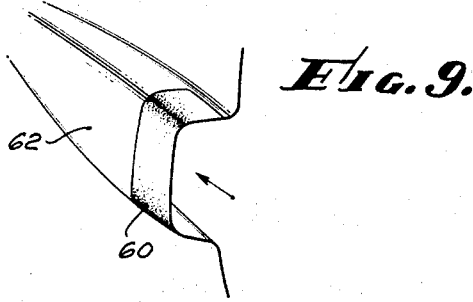
INVENTOR.
NORMAN E. NELSON
BY
ATTORNEY.

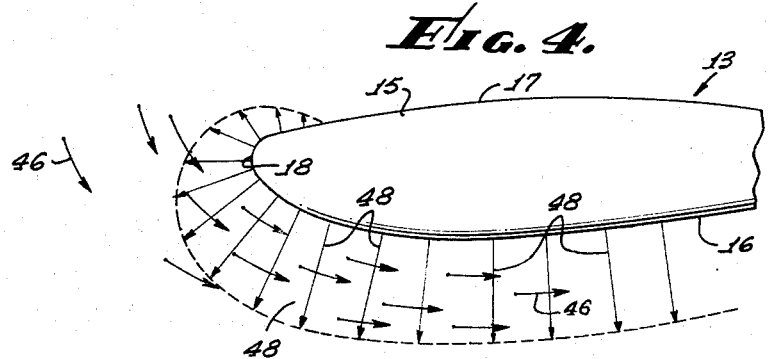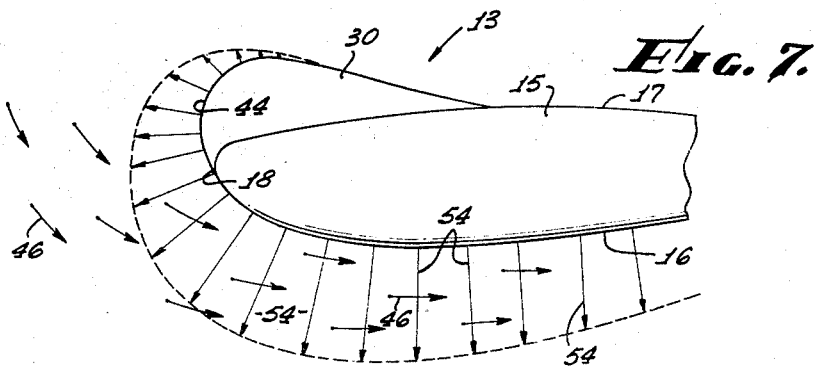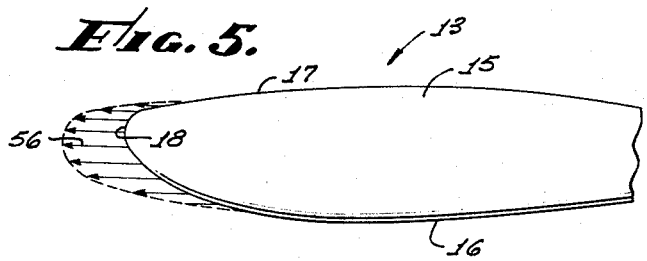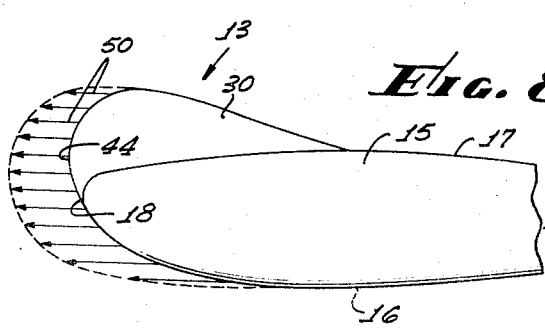

United States Patent Office 2,948,111
Patented Aug. 9, 1960

2,948,111

MEANS TO INCREASE STATIC PRESSURE AND ENHANCE FORWARD THRUST OF AIRCRAFT COMPONENTS

Norman E. Nelson, Los Angeles, Calif., assignor to Doak Aircraft Co., Inc., Torrance, Calif., a corporation of California Filed May 2, 1955, Ser. No. 505,377

2 Claims. (Cl. 60—35.5)

This invention relates to improvements in aerodynamic surfaces, and particularly to improvements in the aerodynamic properties of such surfaces under widely divergent conditions of flight or flight speed.

Designers of high speed aircraft have long sought ways to increase or to supplement the propulsive thrust of such aircraft under conditions of low or zero speed so that take-off or landing on short runways or even substantial hovering might be possible. Under current dictates of airfoil design, however, almost all forwardly directed surfaces, such as body, wing and air scoop surfaces, are streamlined so that obstructions to the flow of high velocity air about the aircraft or through its propulsion units are minimized. As a result, few efforts have been made heretofore to take full advantage of the negative pressure or static thrust capable of being developed by the movement of air streams at high velocity about the airfoil sections. This has been particularly true in the design of jet shrouds, airscoops and other air intake ducts where streamlining for minimum drag at relatively high aircraft speeds has long been an essential requirement. Yet it is known that considerable static thrust may be developed by a surface in the presence of high velocity air streams such as are commonly generated by the propulsive units of modern high speed aircraft.

The present invention provides for the first time, in an aerodynamic surface, the advantages of conventional airfoil configuration for high speed flight conditions, and an improved configuration of increased thickness and surface area for low speed flight conditions. It provides for the first time means to selectively increase the forward surface area of an aircraft duct or shroud and, thereby to achieve an increased static thrust axially opposed to airflow through the duct. It provides for the first time an aircraft intake duct which is expandable outwardly from an airfoil surface to increase the frontal area, yet which also is reducible, at the choice of the operator, to a minimum frontal area during high speed flight to minimize duct drag. It provides for the first time expandable means, operable from within the aircraft, for altering the outer streamlines profile of a shroud, airscoop or other aerodynamic surface without affecting the airfoil profile presented by the inside of the surface. Other objects and advantages of the invention will be apparent from the following detailed disclosure of an exemplary embodiment of the invention, which will enable one skilled in this art to fully understand the same.

In the drawings:

Fig. 1 is a view in perspective of an aircraft propulsion unit employing an expandable member according to the invention.

Fig. 2 is a view in plan of the device of Fig. 1, showing diagrammatically a fluid supply and control unit for selectively operating the expandable member.

Fig. 3 is an enlarged view in section of an outer duct portion of the propulsion unit, showing a normal or deflated position of the expandable member for high speed flight conditions.

Fig. 4 is a diagrammatic representation of static forces acting on the airfoil section of Fig. 3 in the presence of an air stream.

Fig. 5 is a similar representation of the axial components only of the static forces depicted in Fig. 4.

Fig. 6 is an enlarged detail view similar to Fig. 3, showing an inflated position of the expandable member for take-off, slow speed or hovering flight conditions.

Fig. 7 is a diagrammatic representation of static forces acting on the inflated airfoil section of Fig. 6 in the presence of an air stream.

Fig. 8 is a similar representation of the axial components only of the static forces depicted in Fig. 6.

Fig. 9 is a view in front elevation, showing a modified form of the invention as it might be employed in a conventional air intake scoop.

In accordance with the present invention, use is first made of the principle that the total energy of a particle in motion is constant at all points on its path in a steady flow. Applying this principle for example to the air ducts commonly found in high speed aircraft, as the energy of motion increases upon passage of the air through a restricted portion of the duct (as through the throat of a propulsion unit) it is necessary for the energy of pressure to decrease. A second principle involved is that the total aerodynamic force exerted on a surface, and which by statics must be opposed by the surface, is exerted in a direction perpendicular to the surface. Thus, as the energy of pressure is reduced adjacent a surface due to increased air velocity, the negative pressure or "static thrust" exerted by the surface must increase. The force and direction of such static thrust will depend on several factors, such as the area of the surface and its orientation with respect to the direction of airflow. It follows that by properly orienting a surface adjacent an air stream, it may actually be possible to develop a substantial static thrust in a direction supplemental to the thrust developed by a propulsion unit in an aircraft. Under high speed flight conditions, however, such orientation would undoubtedly produce excessive drag on the surface and, consequently, resistance to forward movement of the aircraft. For this reason the concept of static thrust as a propulsive supplement has generally been rejected in the design of modern high speed aircraft.

In its broadest sense the present invention takes any aerodynamic surface having surfaces about which high velocity air is adapted to flow, and provides as a forward part of at least one of the surfaces an expandable member capable of being selectively expanded during low or zero speed flight conditions to increase the area of impingement of air against the surface. At high speeds, however, the member may advantageously be deflated to its normal airfoil profile so that a minimum drag or interference with forward motion of the surface is presented. In a narrower sense, the invention provides an inflatable device about the outer forward periphery of an air intake duct, and particularly about one open end of a duct or shroud in which is positioned a thrust generating device, such as a jet engine or a bladed suitably designed propeller. As will be later explained in greater detail, a selective increase in thickness or surface area due to inflation of the peripheral nose or entry of the duct produces an increased static thrust in a direction axially opposed to the entering air stream. This increase in thrust, often as high as 50%, is of considerable importance during take-off, hovering or low speed flight operations. It is believed that this unexpected increase in total thrust results from the high velocity air passing over a larger surface area as it is drawn into the duct inlet which, in turn, increases the area of reduced static pressure adjacent the duct surface, producing a greater total axial force or thrust. As a result of this phenomenon, the usefulness of shrouded or duct-type propulsion units at low speeds has been enormously increased, without in any way interfering with the high speed performance of such units.

In the exemplary device illustrated, the invention is particularly related to the propulsion unit of an aircraft in which the thrust generating means is provided within the throat or duct of the propulsion unit. While the invention is applicable to any such ducted propulsion unit, it is particularly applicable to an open-ended tubular duct having a wall of airfoil configuration in section, and a multibladed fan or impeller mounted in the duct for rotation about an axis coincidental with the axis of the duct. Such a unit is described in detail in a copending application, Serial No. 472,313, filed by Edmund R. Doak on December 1, 1954, now abandoned. As is described in that application, such thrust producing propeller units may be carried by the lateral extremities of the wings and be provided with means for partially rotating each propulsion unit about an axis transverse to the body of the aircraft, thereby permitting the aircraft to become airborne in a virtually vertical manner and to fly at high speed after being airborne. It is to be understood, however, that the present invention is not directed to details of construction of any particular propulsion unit, and therefore the details of such units are not described but are indicated in the drawings as exemplary of various constructions and designs which may be employed.

As best seen in Figs. 1 and 2, the propulsion unit 13 comprises a wall or shroud 15 of airfoil cross section presenting a smooth, internal, tubular surface 16 and an external surface 17, these two surfaces merging to form a leading edge 18 which is rounded in its normal condition and a trailing edge 19. The internal surface 16 may, in effect, give rise to a duct having a slightly smaller internal diameter in a zone from about 20% to 60% of the total length of such duct from the leading edge 18.

Centrally positioned within the open-ended duct of the propulsion unit 13 is a multibladed fan 20 carried by a hub portion 21 mounted for rotation upon an axis coincidental with the axis of the duct. A spider or a series of spaced contravanes 25 attached to a trailing portion 23 of the hub and to the walls of the duct maintain the blade assembly in proper position within the duct.

According to the invention the outer airfoil surface 17 is provided with an inflatable elastic member or boot 30 extending from the leading edge 18 rearwardly along the surface 17. Preferably the inflatable member 30 is constructed as a cylindrical member faired into the contour of the upper or outer surface 17 of the propeller shroud 15 so that under high speed flight conditions substantially no drag or obstruction to the flow of high velocity air over the surface 17 is created.

In its construction, the elastic member or boot 30 may be natural rubber or an elastomer employing any number of synthetic polymers conventional in industrial use. The essential requirement is that the particular material used provide sufficient elasticity to permit substantial inflation of the member in the presence of a fluid under pressure, and a spontaneous return of the member to its unstretched state upon deflation. As best seen in Figs. 3 and 6, the boot 30 preferably is attached to the airfoil section in a leak-tight manner so as to form a pressure-tight envelope extending circumferentially about the propeller shroud from its leading edge 18 to a point 26 removed from the leading edge, say approximately 10% to 30% of the distance from the leading edge to the trailing edge 19. Any suitable means may be employed to provide an airtight seal at these points, but a dual system employing vulcanization as well as mechanical fasteners may prove preferable. In addition, circumferential cord reinforcements 31 may be provided in the areas of seal and attachment of the boot to the shroud so that excessive circumferential stretching in these areas may be prevented. Moreover, if desired, the wall thickness of the inflatable boot may be varied to provide for variations in stretching under a uniform internal pressure. In the illustrated embodiment, is shown for example, a boot which is thicker adjacent points of attachment to the shroud than at other points.

In Fig. 3 the rubber boot is shown deflated, fitting tightly to the contour of the shroud 15 in confluent relation to the surfaces 16 and 17 for high speed flight conditions. In Fig. 6, the boot 30 is shown in an inflated position as would occur when it was desired to improve the static thrust of the propeller shroud at low or zero speed flight conditions. As shown, the boot when inflated presents an uninterrupted, continuous, frontal surface 44 of relatively large frontal area. Although the degree of inflation necessary may, to a certain extent, constitute an engineer's choice, expansion of the boot less than 10% of the normal thickness of the leading edge 18 will not normally produce sufficient useful static thrust to achieve the purposes of the invention. In practice, the degree of inflation will be at least 50% the normal thickness of the leading edge and preferably between 100% and 300% of such thickness. However, as a general statement, it may be said that on expansion the member 30 must present a frontal surface not less than 10% greater in thickness than the distance separating the inner and outer surfaces of the wall 15 at the zone of interconnection with the normal frontal surface 44.

To permit inflation of the expandable member 30, a circumferential channel 32 is provided adjacent the inside surface of the member 30 extending all around the propeller shroud 15. Preferably lengthwise channels 42 are also provided in communication with the circumferential channel 32, at spaced points about the periphery of shroud 15, to insure uniform inflation. Connecting channel 32 with any suitable source of fluid under pressure, such as compressed air, is a supply conduit 34 extending lengthwise of the shroud section 15 to an inlet conduit 36. The conduit 36 in turn leads to the interior of the aircraft and to a suitable compressor such as a small pump, represented diagrammatically in Fig. 2 by the numeral 38. Providing selective control over the flow of compressed air through the conduits 36, 34 and 32 to the inflatable member 30 is a valve 40, which may be opened by the pilot prior to take-off or landing, or whenever maximum thrust is desired.

The operation of the expandable member 30 in increasing the thrust of the propulsion unit 13 under zero or low speed flight conditions is as follows:

Assuming an aircraft preparing to take off from a short runway, in a situation where maximum thrust is desired from a propulsion unit, the pilot will open the valve 40, allowing compressed air to flow through the supply conduits to the circumferential channel 32 and lengthwise channels 42 in the propeller shroud. The flow of compressed air will cause the inflatable boot 30 to expand from a normal deflated position as shown in Fig. 3 to an inflated position as shown in Fig. 6. As a result of this inflation the frontal area or surface 44 presented by the expandable boot 30 is increased to a very substantial degree. As the rotation of the propeller 20 is increased high velocity air rushes through the duct formed by the internal tubular surface 16 of the shroud 15. This flow of air through the duct is represented diagrammatically in Fig. 7 by arrows 46. As will be apparent to one skilled in the art, the velocity head of the air stream is considerably increased as it passes through the restricted zone presented by the slightly smaller internal diameter at the throat of the duct. As a result of this increase in the velocity of the air stream, the static pressure adjacent the internal surface 16 is greatly reduced producing suction forces on the duct surface as indicated by the arrows 54. Because of the increased frontal area 44 presented by the inflated duct, the axial components of static thrust, as represented by the arrows 50 in Fig. 8, provide a major increase in the total thrust axially of the duct. By actual test it has been determined that the static thrust supplementing the normal thrust of the propulsion unit is from 30% to 40% of the total thrust of the propulsion unit or even higher. It will be apparent therefore that as the aircraft approaches the point of actual take-off this added thrust will permit the take-off in a much smaller space and much more rapidly than otherwise possible. After take-off has been accomplished, the valve 40 may be closed by the pilot, cutting off the source of compressed air. By providing a two-way valve, the valve 40 may provide exhaust outlet from the boot, allowing its deflation and return to its normal position as shown in Fig. 3. In this position of the boot, very little frontal area 44 is presented to the flow of air about the airfoil sections of the propeller shroud 15. As a result, drag on the forward movement of the aircraft at high speeds is kept minimal. This may be adequately demonstrated from Figs. 4 and 5 where the static thrust developed by the movement of air into and through the propeller shroud 15 is shown by the arrows 48 in Fig. 4, while the axial components of this static thrust are indicated by the arrows 56 in Fig. 5. It will be evident that compared to the thrust illustrated in Fig. 8, the axial components of thrusts shown in Fig. 5 are relatively insignificant and that the boot 30 will provide very little interference with normal high speed flight conditions.

From the above detailed description, it will be apparent that the present invention makes possible an airfoil configuration for the propulsion units of high speed aircraft that provides a minimum of drag under high speed flight conditions, yet which is capable of being selectively expanded to increase the frontal surface thickness of the leading edge of the airfoil by at least 10%, and thereby to achieve a unique increase in the components of static thrust axially of the propulsion unit. In turn, these axial components make possible an increase in total thrust up to 50% of the thrust developed by the propulsion unit itself and, as a consequence, facilitate take-off, low speed or hovering flight conditions under heretofore prohibitive conditions of air space. Moreover, the improved thrust may be provided at the choice of the pilot of the aircraft, whenever desired, merely by manipulation of a simple control provided within the pilots compartment.

To those skilled in the art to which this invention relates, many changes in construction and widely differing embodiments and applications of the invention will suggest themselves without departing from the spirit and scope of the invention. For example, the principles of the present invention are not limited to aircraft propulsion units such as are illustrated in the drawings, but are applicable to any aerodynamic surface about or through which high velocity air streams are adapted to flow. Thus, in Fig. 9, an expandable member 60 is provided about the periphery of a conventional airscoop 62, and in similar fashion may be inflated during low speed flight conditions to increase the overall forward thrust of any aircraft employing such an airscoop. Moreover, the invention is not limited to ducted aerodynamic surfaces but might also be employed in any surface around which air is caused to flow while the aircraft is operating at zero or very limited forward speeds. Accordingly, it should be understood that the disclosures and the description herein are purely illustrative and are not intended to be in any sense limiting.

I claim:

1. An aircraft capable of supplementing the normal thrust output of the aircraft's engine by greater than 30% during flight conditions of hovering, low speed, or take-off, comprising: an open-ended duct having inner, outer and forward wall surfaces; said forward surface having a blunt leading edge of appreciable thickness which is rounded in its normal condition, said inner surfaces converging to provide a throat of smaller internal diameter rearwardly from said leading edge; thrust-generating means mounted centrally within said duct and located at said throat for drawing and increasing the velocity of air over said wall surfaces and through said duct; said forward surface and the section of said outer surface adjacent said forward surface comprising elastic and resilient means capable of being expanded to form an uninterrupted, continuous and enlarged frontal surface; and means for expanding and increasing the normal rounded thickness of said frontal surface by 50% to 300%, said increase in frontal surface thickness effecting increased areas of reduced static pressure adjacent the duct surfaces and producing an increase of greater than 30% of the normal thrust axially of the duct for hovering, low speed or take-off flight conditions wherein an increase of below 50% of the normal thickness of said frontal surface will be incapable of producing any appreciable increase in thrust.

2. An aircraft as stated in claim 1 wherein said smaller diameter throat is present in a zone from 20% to 60% of the total length of the duct from the leading edge to increase the velocity of the incoming airflow to produce a greater static thrust axially of the duct.

References Cited in the file of this patent

UNITED STATES PATENTS

| | | |
|---|---|---|
| 1,873,505 | Stipa | Aug. 23, 1932 |
| 2,271,760 | Colley | Feb. 3, 1942 |
| 2,378,528 | Arsandaux | June 19, 1945 |
| 2,780,913 | Nicks | Feb. 12, 1957 |